(12) United States Patent
Surh et al.

(10) Patent No.: US 6,818,964 B2
(45) Date of Patent: Nov. 16, 2004

(54) SELECTIVELY-ETCHED NANOCHANNEL ELECTROPHORETIC AND ELECTROCHEMICAL DEVICES

(75) Inventors: Michael P. Surh, Livermore, CA (US); William D. Wilson, Pleasanton, CA (US); Troy W. Barbee, Jr., Palo Alto, CA (US); Stephen M. Lane, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/261,349

(22) Filed: Sep. 30, 2002

(65) Prior Publication Data

US 2004/0063309 A1 Apr. 1, 2004

(51) Int. Cl.[7] .............................................. H01L 29/00
(52) U.S. Cl. ...................................... 257/531; 257/724
(58) Field of Search ................................ 257/203, 296, 257/678, 686, 724, 723, 531

(56) References Cited

U.S. PATENT DOCUMENTS 6,534,842 B2 * 3/2003 Ibata et al. .................. 257/531

2003/0029636 A1 * 2/2003 Carpenter et al. ........... 174/260

FOREIGN PATENT DOCUMENTS

EP          0376611 A2    12/1989
WO      WO 01/56771 A2     8/2001

* cited by examiner

Primary Examiner—Dung A. Le
(74) Attorney, Agent, or Firm—L. E. Carnahan; John P. Wooldridge; Alan H. Thompson

(57) ABSTRACT

Nanochannel electrophoretic and electrochemical devices having selectively-etched nanolaminates located in the fluid transport channel. The normally flat surfaces of the nanolaminate having exposed conductive (metal) stripes are selectively-etched to form trenches and baffles. The modifications of the prior utilized flat exposed surfaces increase the amount of exposed metal to facilitate electrochemical redox reaction or control the exposure of the metal surfaces to analytes of large size. These etched areas variously increase the sensitivity of electrochemical detection devices to low concentrations of analyte, improve the plug flow characteristic of the channel, and allow additional discrimination of the colloidal particles during cyclic voltammetry.

9 Claims, 2 Drawing Sheets

SELECTIVELY-ETCHED NANOCHANNEL ELECTROPHORETIC AND ELECTROCHEMICAL DEVICES

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to nanolaminated structures, particularly to flat, polished surfaces of nanolaminate composites to enhance the detection of dilute analyte particles in water, and more particularly flat, polished surfaces of nanolaminates having trenches and/or baffles selectively etched therein to increase the amount of exposed conductive materials in the flat surfaces or to screen the conductive materials from analytes of larger sizes, thereby increasing the sensitivity or selectivity of detection devices.

Electrophoretic and electrochemical devices have been proposed that employ flat, polished, exposed surfaces of nanolaminate composites to enhance the detection of dilute analyte particles. The nanolaminate composites were formed by magnetron sputtering of alternating layers of a conductive material and an insulative material, such as silica and alumina, whereafter the composites were cut and polished to expose a nanolaminate surface as a sensor. These prior nanolaminate composites or structures are exemplified by the sensor template described and claimed in copending U.S. application Ser. No. 10/167,926, filed Jun. 11, 2002.

The present invention is an improvement of the prior nanolaminate approach and comprises the formation of trenches and baffles in the flat exposed surface of the nanolaminate, the formation of such trenches and baffles being carried out by selective etching, whereby greater exposed conductive surfaces are produced in the nanolaminate, or the conductive surfaces are recessed and screened by insulating baffles.

SUMMARY OF THE INVENTION

It is an object of the present invention to provide improved microlaminated composites for detection of dilute analyte particles.

A further object of the invention is to provide microlaminate composites with trenches and baffles for increasing exposed surface area of the composites, or for screening the relevant surfaces.

A further object of the invention is to provide selectively-etched nanochannels for electrophoretic and electrochemical devices.

Another object of the invention is to increase the sensitivity of electrochemical detection devices to low concentration of analyte.

Another object of the invention is to increase the amount of exposed metal in nanolaminate composites to facilitate electrochemical redox reaction or to control the exposure of the metal surfaces to analyte of large size, and allow additional discrimination of colloidal particles during cyclic voltammetry.

Another object of the invention is to improve the plug flow characteristic of a fluid channel incorporating nanolaminate surfaces.

Another object of the invention is to provide flat, exposed striped surfaces of nanolaminate composites with selectively-etched trenches and baffles that provide size selectivity in performing electrochemical redox reactions.

Other objects and advantages of the invention will become apparent from the following description and accompanying drawings. Basically, the invention involves selectively-etched nanolaminate composites or structures for electrophoretic and electrochemical devices. For example, the selectively-etched nanolaminates may be composed of alternating layers of a metal and an insulator, cut to expose the metal and insulator on a preferably flat surface. The metal and/or the insulator layers may be etched such that the exposed surfaces protrude into the fluid channel by controlled amounts. The selectively-etching may result, for example, in baffle of protruding layers, the metallic layers having been partially etched away. Also, the nanolaminates can be etched to form trenches or fluid flow channels therein. In addition, the selective-etching may result in a baffle of protruding layers located between two etched channels. A series of etched nanolaminates may be positioned along a fluid flow channel to function a successive filtration states as the fluid flows through the channel, which is accomplished by a series of etched baffles or trenches which function as individual sieves for different size particles. Also, etched channels in one nanolaminate may be combined with a second etched nanolaminate to enable size-selected cyclic voltammetry between the electrodes or exposed metal strips or layer sections of each nanolaminate.

The selectively-etched nanolaminate composites or structures may be incorporated into any microfluidic device for the purpose of processing, separating, or performing a chemical or biological assay or analysis on a very small fluid sample. Such devices can be used as detectors of pathogens or other trace analytes.

BRIEF DESCRIPTION OF THE DRAWINGS

The accompanying drawings which are incorporated into and form a part of the disclosure, illustrate embodiments of the invention and, together with the description, serve to explain the principles of the invention.

DETAILED DESCRIPTION OF THE INVENTION

The present invention is directed to selectively etched nanolaminate composites or structures for electrophoretic and electrochemical devices. The devices, as illustrated and described herein, are generalizations of an electrophoretic fluid transport channel consisting of surfaces composed of metal/insulator layers which protrude into (or recede from) the fluid channel by controlled amounts. The prior known flat surfaced nanolaminate composites are improved by the introduction of trenches and baffles in the surfaces thereof. The selectively-etched areas can expose increased amounts of exposed metal to facilitate electrochemical redox reaction or control the exposure of the metal surfaces to analytes of large size. These etched areas variously increase the sensitivity of electrochemical detection to low concentrations of analyte, improve the plug flow characteristic of the channel, or allow additional discrimination of colloidal particles during cyclic voltammetry.

Figure 1:
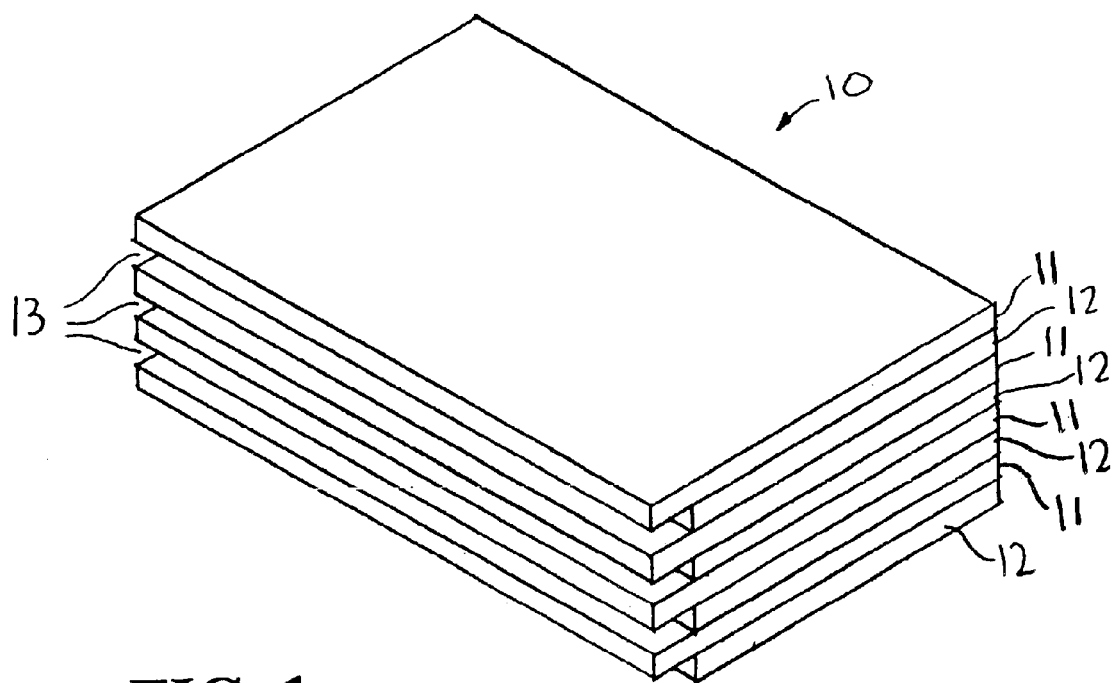
FIG. 1 illustrates a trench configuration of an etched nanolaminate composite in accordance with the present invention illustrating the exposed metal baffles.

Electrophoretic and electrochemical devices have been proposed that employ the flat, polished of nanolaminate composites to enhance the detection of dilute analyte particles in water. Modification of these designs by selective etching of the surfaces offers multiple improvements. Chemically-selective etching of the flat, striped nanolaminate surface can create rows of recessed layers of one material separated by raised baffles of the other. For example, a gold/silica bimaterial composite can be exposed to HF to etch the silica layers, or electrochemical processing can etch back the gold layers. Reasons of mechanical strength suggest that etching be limited to depths comparable to the layer spacing, which can be achieved by controlling the elapsed time or other parameters of the etch process. The processing will, thus, make parallel arrays of short, free-standing walls of either metal or insulator (FIG. 1). The aspect ratio of these trenches need extend to at most depths of one or two times the width of the etched layer in order to efficiently exclude particles with diameters greater than the stripe thickness.

As seen in FIG. 1, a nanolaminate composite or structure 10 includes alternating layer 11 of metal and layer 12 of insulator. The flat or front face of the structure 10 has been chemical-selectively etched such that the metal layer 11 protrude outwardly (raised) from the insulator recessed portions of layers 12 forming trenches 13 between the outer edges of the metal layers 11. Alternatively, the metal layers 11 may be etched so as to leave protruding insulator, layer 12 baffles.

Figure 2:
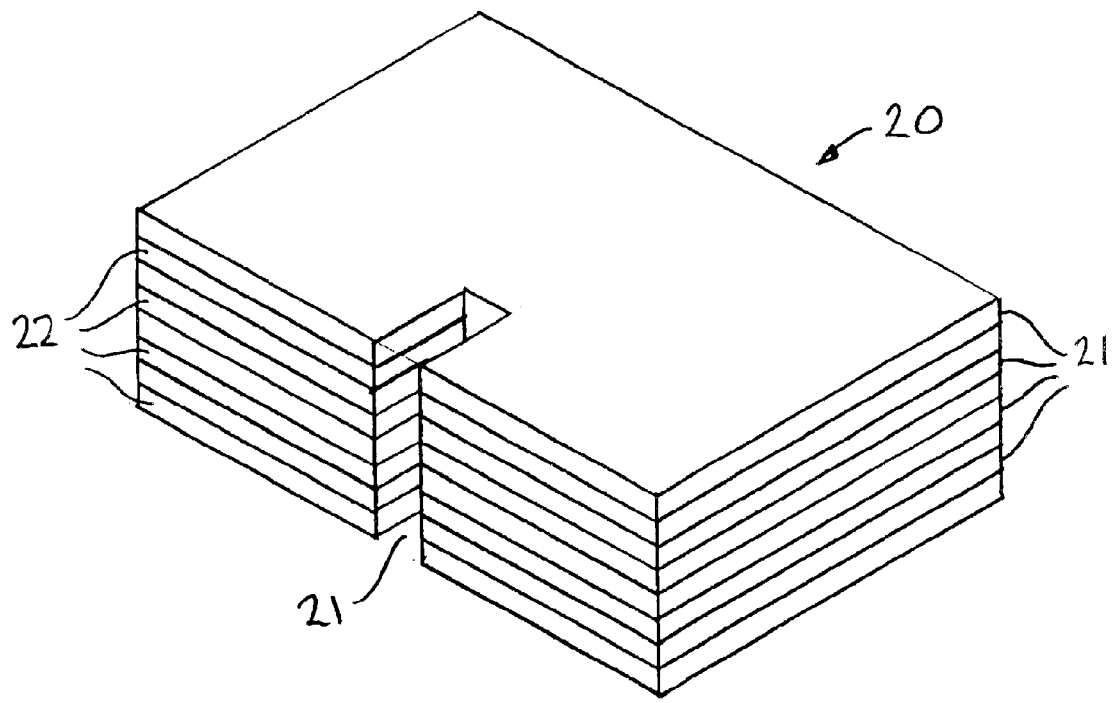
FIG. 2 illustrates an embodiment with an etched channel therein having exposed metal layers on three sides of the channel.

Photolithographic or other patterning techniques (e.g., dip-pen lithography, lithographic stamping, ink-jet printing, or other means of measuring and exposing patterned regions) permit the etching of all component material layers in exposed regions by chemical or plasma processing. Any of these patterning techniques are understood to be included hereby descriptions of lithographic processing. Such lithographic processing allows the manufacture of trenches that transect the layers of nanolaminate (FIG. 2). Multiple trenches of differing widths are possible; they need be neither straight nor perpendicular to the material layers. Trenches may even intersect one another to facilitate mixing or separation processes.

As seen in FIG. 2, the nanolaminate composite or structure, indicated at 20, is basically similar to than of FIG. 1 prior to the selective etching process in that it consists of alternating layers 21 of metal and layers 22 of insulator. The flat or front face or surface of structure 20 is provided with a trench or channel 23 formed by lithographic patterning and chemical or plasma etching. The trench or channel 23 has exposed metal layers 21 on three sides or walls thereof. This may function as a fluid flow channel, particularly where a cover member or plate forms the fourth wall. The dimensions of the trench or channel 23 is limited by the spatial resolution of the patterning and etching technique. If desired, the walls of trench 23 can be etched to form baffles of either metal 21 or insulator 22.

Among the improvements afforded by these modifications are: 1) The lithographic trenches in FIG. 2 can define three sides of an electrophoretic channel, thereby leading to increased plug-like flow along the trench. If the lithographic mask is thick enough to be an effective insulator, it can serve as a gasket so that a second, flat nanolaminate may be pressed onto the first. Alternatively, an adhesive, insulating layer may be added to form the fourth wall of the channel. The small trenches can be cleaned of excess adhesive by briefly flowing solvent through if any adhesive should have penetrated the channels during assembly of the device. In this device, incorporating another nanolaminate as the fourth wall, all four sides of the channel will induce electrophoresis when an electric field is applied, leading to nearly perfect plug flow. 2) this design also increases the electrode surface area to fluid volume ration to give efficient cyclic voltammetry between the two nanolaminates. 3) Both nanolaminate materials may be incorporated with trenches. The trenches and the layers need not be parallel between the two nanolaminates. The intersection of trenches in one nanolaminate with the trenches in the second will permit mixing or electrophoretic separation of particles. 4) Raised baffles of metal in FIG. 1 will increase the area of the electrodes to facilitate electrochemical reactions. The sharp edges of the free-standing layers will increase the local electric fields and similarly accelerate electrochemical reduction and oxidation processes. 5) Raised baffles of insulator in FIG. 1 will block the diffusion of large particles to make contact with the metal electrode surfaces. Particles with diameter larger than the metal layer thickness (i.e., greater than the baffle spacing) will be unable to contact the electrode and be electrochemically oxidized or reduced. This allows a size-selectivity to all cyclic voltammetry measurements. 6) The sharp corners of the recessed electrodes will be partially blocked by the protruding insulating baffles. This will make the electric field at the accessible metal surface more uniform. The uniformity of electric field will improve cyclic voltammetric characterization of analyte molecules or particles, yielding sharper I(V) characteristics. 7) The application of a flat cover directly to the baffles in FIG. 1 creates many tiny channels. The channel cross-section is determined by the nanolaminate layer thickness, and can be as small as several nanometers. The regular array of channels then functions as a siever, preventing the passage of large particles.

Figure 3:
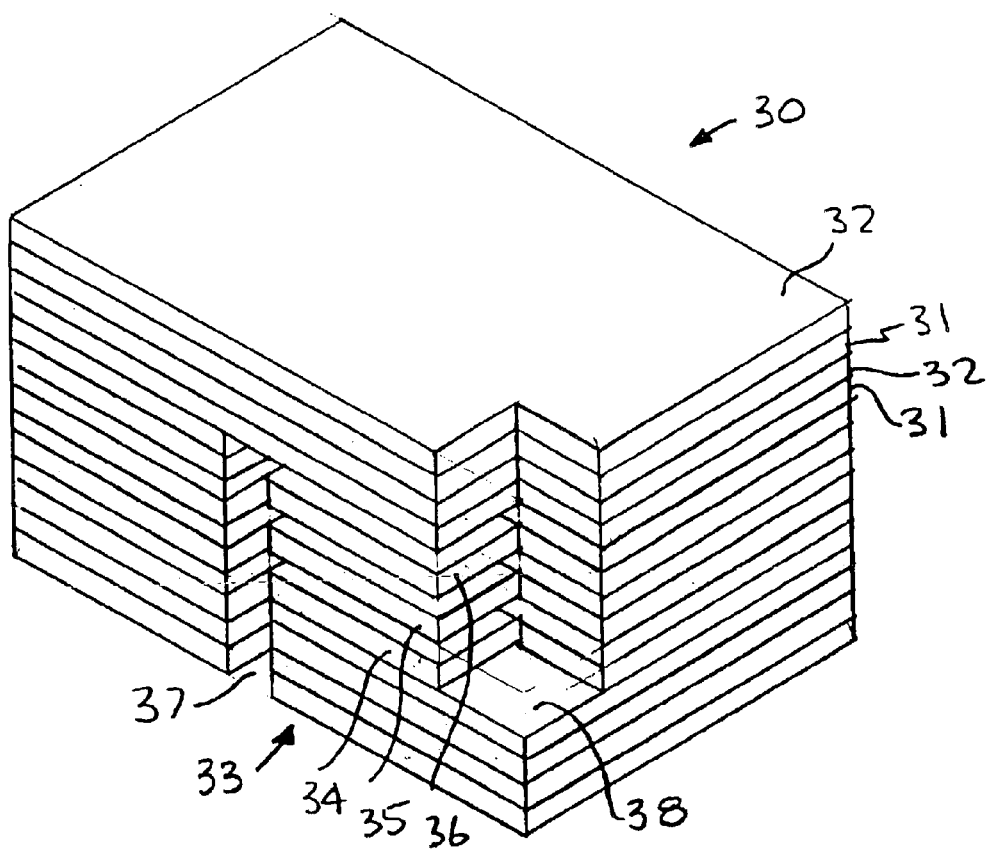
FIG. 3 illustrates an embodiment having a nanometer scale sieve placed between two electrophoretic channels.

Combinations of selective chemical etching of either metal or insulator layers and lithographic patterning and etching of all component materials allow increased sophistication of design. Segments of nanolaminate sieve may be interspersed with segments of electrophoretic channels as shown in FIG. 3. Fluid flow through the sieve region will require a pressure gradient, so the segments must be kept short. Electrophoretic flow in such a device will only pass particles below a critical diameter. Intermittent periods of backflow will act to flush the channel of accumulated particles that are too large to pass. The nanolaminate layer thickness need not be constant over the entire composite. If the layer spacing is decreased in the upper layers (not shown in FIG. 3), then the nanometer-scale siever there will pass only smaller particles. Successive stages of filtration during flow through the device can remove all but the smallest particles. Branched channels could carry away large particles that cannot pass the siever, and would permit a size-separation of colloidal particles in a continuous process. Channels of the sort in FIG. 4 can be combined with a second nanolaminate electrode to allow electrophoretic flow along the channel and size-selected cyclic voltammetry between the electrodes. This is depicted with the recessed metal electrodes and protruding insulator layers.

Figure 4:
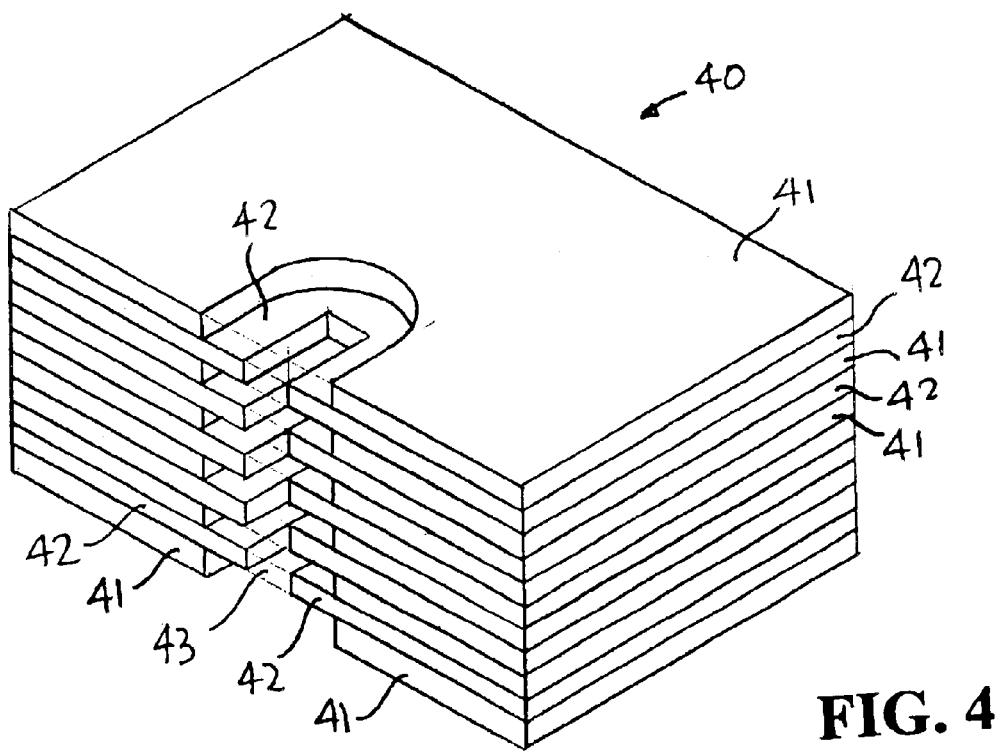
FIG. 4 illustrates an embodiment having a single trench-type channel with the electrodes recessed between insulating baffles.

FIGS. 3 and 4 illustrate combination of chemically-selective etching and lithographic patterning and etching, and combine the baffle/trench and trench or channel arrangements of FIGS. 1 and 2. Note that each of the nanolaminates of FIGS. 3 and 4 are thicker (have more alternating layers of metal and insulator) than the nanolaminates of FIGS. 1 and 2, a nanolaminate structure 30 of layers 31 of metal and layers 32 of insulator, and a nanometer scale sieve generally at 33 which includes three protruding insulator layer sections or baffles 34, 35 and 36 positioned between trenches or channels 37 and 38, which extend only partially through the nanolaminate structure 30.

A single trench-type channel is shown in nanolaminate structure 40 in FIG. 4, with metal layers or electrodes 41 recessed between insulator baffles or layers 42, so as to only permit small particles to contact electrodes 41 and participate in redox reactions. As seen in FIG. 4, a trench or channel 43 extends through nanolaminate 40, and the metal layers 41 have been etched back so as to produce the protruding insulator layers or baffles 42. A plate or cover, not shown, may be placed across trench 43 to form a closed fluid channel flowing vertically as shown.

It has thus been shown that the present invention provides improved nanolaminate composites, wherein sections thereof are etched and/or lithographic processed and etched to form trenches, baffles and flow channels in the nanolaminate composites. For example, the exposed, polished, flat surface of a previously formed nanolaminate composite is processed by this invention to include a nanometer-scale sieve located between two electrophoretic channels, whereby large particles that cannot pass the sieve would be carried away, and would permit a size-separation of colloidal particles in a continuous process. Further, channels and/or baffles formed using combinations of chemically-selective etching lithographic patterning and etching in one nanolaminate can be combined with a second nanolaminate to allow electrophoretic flow along the channel and size-selected cyclic voltammetry between electrodes of the two nanolaminates.

While particular embodiment, materials, etc., have been illustrated or described to exemplify and teach the principles of the invention, such are not intended to be limiting. Modifications and changes may become apparent to those skilled in the art, and it is intended that the invention be limited only by the scope of the appended claims.

What is claimed is:

1. An apparatus, comprising
   a nanolaminate composite for electrophoretic and electrochemical applications, wherein said nanolaminate composite comprises at least one electrophorelic fluid transport channel and has at least one surface containing exposed conductive layers and exposed insulative layers, wherein said at least one surface includes at least one of baffles, trenches, sieves, and channels formed therein.

2. The apparatus of claim 1, wherein said at least one surface includes protruding baffles selected from one of said conductive layers and insulative layers.

3. The apparatus of claim 2, wherein said at least one surface includes at least one trench intermediate a pair of said protruding baffles.

4. The apparatus of claim 1, wherein said at least one surface includes a channel extending at least partially through said nanolaminate composite, said channel being constructed to form exposed conductive and insulative layers on the surface thereof.

5. The apparatus of claim 4, additionally including at least one protruding baffle in said channel.

6. The apparatus of claim 1, wherein said at least one surface includes a nanometer-scale sieve to separate larger particles from smaller particles.

7. The apparatus of claim 6, wherein said at least one surface includes a plurality of channels located on opposite sides of said sieve.

8. The apparatus of claim 1, wherein said at least one surface includes a channel extending through said nanolaminate composite.

9. The apparatus of claim 8, wherein said at least one surface includes recessed conductive layers and protruding insulative layers to permit only small particles to contact the conductive layers.

* * * * *